Sept. 22, 1953  H. EISNER  2,652,876
ANTISKID TREAD SURFACE
Filed June 3, 1950
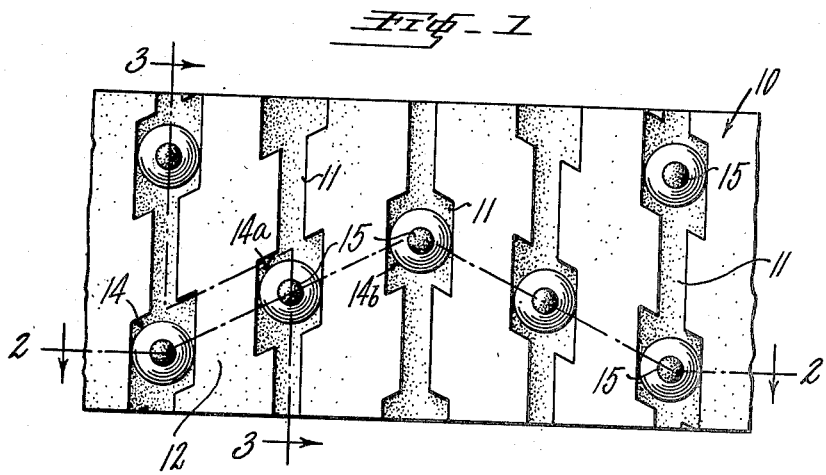
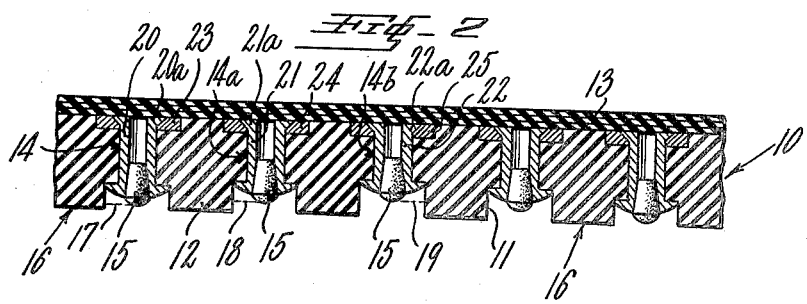
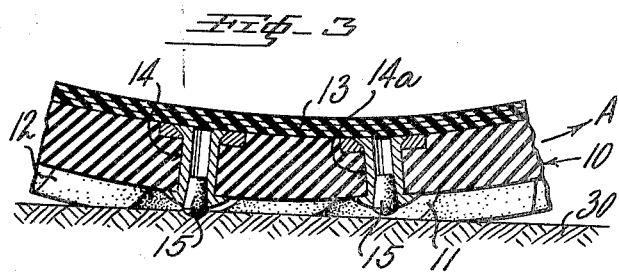
INVENTOR.
HAROLD EISNER
BY Patented Sept. 22, 1953

2,652,876

UNITED STATES PATENT OFFICE 2,652,876

ANTISKID TREAD SURFACE

Harold Eisner, Au Marronier, Prangins, Switzerland

Application June 3, 1950, Serial No. 165,901

5 Claims. (Cl. 152—210)

1

This invention relates to tire, anti-skid and like structures, having a yieldable and profiled tread surface.

It is one of the principal objects of the present invention to provide means affording a considerable improvement in the gripping action and physical reinforcement of the tread surface of tires and like rubber bodies.

It is another object of the present invention to provide means facilitating the accommodation of metallic elements, preferably of cemented hard metal alloy in and relatively to the tread surface of a tire, anti-skid strip, etc. to thereby combine in a tire or like surface the desirable qualities inherent in rubber and similar plastic compositions with the renowned qualities of hard metal (tungsten) alloys.

It is a further object of the invention to provide means ensuring the incorporation of elements of sintered metal carbide of different lengths and positions in the tread surface of a relatively soft rubber body to thereby bring about suitable contour and marked traction qualities for the tread surface.

Yet a further object of the invention is to provide means increasing to an important degree the life of tires and like rubber bodies which, even when subjected to considerable wear and tear readily withstand great frictional and tractional forces.

Still a further object of the invention is to provide means rendering possible the construction of a tire and like body which, after extensive use and wear during spring and summer seasons becomes particularly suitable for employment on icy roads and those covered with snow.

These and other objects are attained according to the invention, a more particular description of which will hereinafter appear and the particular features thereof be set forth in the appended claims.

In the drawing:

Fig. 1 is a top plan view of a tread surface forming part of a tire or anti-skid device to be applied to the ordinary tread surface of a tire.

Fig. 2 is an enlarged section taken along lines 2—2 of Fig. 1.

Fig. 3 is a section taken along lines 3—3 of Fig. 1 and in engagement with a road.

Referring now more particularly to the drawing, there is shown in Fig. 1 a body 10 made from rubber or similar material having the grooves 11 defining rubber blocks 12 therebetween. The grooved rubber tread surface may have any suitable shape and configuration and may be reinforced by canvas or similar layers 13, at the base of said grooves as seen in Figs. 2 and 3.

Within predetermined locations of said grooves 11 of the tread surface there are arranged traction elements 15 made of a sintered hard metal carbide held in anchors 14 and normally below the upper surface or the level 16 of the tread surface.

As can be seen from Fig. 2, anchors 14 may have different lengths designated by numerals 14a, 14b. In some instances it may be advisable to change the length of elements 15 instead of using different types and lengths of anchors 14.

As can be further seen from Fig. 2, element 15 in anchor 14 reaches to a level 17 below level 16 of the tread surface, whereas element 15 in anchor 14a terminates at 18 further below the level 16 and finally element 15 in anchor 14b projects to a level 19 below the upper tread surface 16.

It is to be noted that the anchors 14, 14a, 14b are all of the same type, comprising hollow rivets 20, 21, 22 which are affixed in position by ring members 23, 24, 25 receiving the outwardly flaring ends 20a, 21a, 22a, respectively of the aforesaid hollow rivets. After the hollow rivets are thus anchored within the rubber body 10 the same is suitably reinforced as hereinabove mentioned with respect to layers 13.

Into the hollows of the rivets 20, 21, 22 are then driven the tapered elements 15 made of sintered tungsten carbide alloy. Thus a structure of a tread surface is obtained which ordinarily works with its gripping or upper surface 16 in a conventional manner. However, when additional traction and non-skid qualities are necessitated to increase the traction and frictional engagement with the road surface the hard metal alloy elements 15 arranged at different levels with respect to the uppermost tread surface 16, which is relatively resilient with respect to the anchored hard metal alloy elements 15, come into action.

Fig. 3 shows the engagement of a portion of the body 10 with the road bed 30, whereby the rubber projections 12 as well as some of the hard metal alloy elements 15 dig into the road bed, whereas other elements 15 are still some distance apart from the latter. The rotation or movement of the tread surface of the body 10 relatively to the road bed 30 is indicated by arrow A.

When the tire or anti-skid tread surface 16 has been worn down to a considerable degree it will be apparent that the gripping elements 15 come into action more and more and, since the same yield relatively to the rubber body 10 in which they are anchored, a gradually increased traction force is exerted by the reinforced tread surface of the rubber or anti-skid body.

As can be further recognized from the drawings, the hard metal means or elements 15 may be distributed over the tread surface and relatively thereto at various levels within the grooves 11 or, if desired, on or recessed in any of the blocks 12.

In Figs. 1 and 2 are illustrated elements 15 progressively increasing in length toward the tread surface 16 from the median portion thereof so that the center elements 15 in anchor or fitting 14b are the farthest away from the tread surface 16, whereas the neighboring elements 15 in fittings 14a are closer to the tread surface 16 and the elements 15 in the outer fittings 14 approach still more the level of the tread surface 16 than the remaining elements.

Although the elements 15 have been described to be made from sintered or cemented tungsten carbide alloy having a degree of hardness of approximately 78 Rockwell C (150 kg. load) corresponding to 88–99 Rockwell A (60 kg. load), it is to be understood that other known hard metal alloys in the form of shapes or particles can be employed for the purpose of this invention.

It is to be noted that the elements 15 are disposed to normally form a right angle to the tread surface and are relatively less yieldable with respect to the tread surface than the block-shaped gripping members 12 of the latter so that upon traction exerted on the tread surface by a road bed said elements 15 come into action only after said gripping members 12 have dug into said road bed to a predetermined degree.

While one embodiment of the invention has been shown and described, it will be easily understood that the same is capable of modification without departure from the general scope and spirit of the invention as defined in the claims.

Having thus described the invention, what is claimed as new and desired to be secured by Letters Patent, is:

1. The combination, with a body having a rubber tread surface with grooves therein, of elements associated with said body and accommodated in said grooves and below said tread surface, said tread surface having a median portion, said elements being anchored in said grooves, respectively, and progressively increasing in length toward said tread surface from said median portion, whereby at least some of said elements are positioned at different levels with respect to said tread surface.

2. A tire, anti-skid and like device for application to a road bed, comprising a body having a tread surface with a median portion, said tread surface being provided with grooves, a plurality of gripping members, and means having different lengths and fixed in said grooves of said body, said means progressively increasing in length from the median portion of said tread surface toward the ends thereof, said gripping members being substantially of equal length and retained in said means, respectively, whereby upon sufficient traction exerted on said tread surface said gripping members come progressively into action.

3. In a tire, anti-skid and like device having a tread surface, gripping members complementary to said tread surface, and means anchored below said tread surface and receiving said gripping members, at least some of said means terminating at different levels with respect to and progressively approaching from the median portion of said tread surface to the level of the latter, said gripping members being round at their ends adjacent said tread surface and being substantially of equal length.

4. In a tire, anti-skid and like device having a tread surface; gripping members positioned within said tread surface, and elements anchored below said tread surface and progressively increasing in length toward the tread surface from the median portion of the latter, said gripping members being round at their ends adjacent said tread surface, said members being wedged in said elements, respectively.

5. The combination, with a body having an integral grooved rubber tread surface, of members made of sintered hard metal and extending in spaced apart relation to each other, and means retaining said members in the grooves of said surface therebelow, said members extending to different levels and said means progressively increasing in length from the median portion of said tread surface toward the lateral ends thereof.

HAROLD EISNER.

References Cited in the file of this patent

UNITED STATES PATENTS

| Number | Name | Date |
| --- | --- | --- |
| 2,469,666 | Raz-Ammann | May 10, 1949 |
| 2,477,601 | Hanson | Aug. 2, 1949 |
| 2,489,110 | Small | Nov. 22, 1949 |
| 2,511,690 | Bergen | June 13, 1950 |

FOREIGN PATENTS

| Number | Country | Date |
| --- | --- | --- |
| 19,332 | Great Britain | 1910 |
| 256,690 | Italy | Jan. 12, 1928 |